(12) United States Patent
Meissner et al.

(10) Patent No.: US 7,389,595 B2
(45) Date of Patent: Jun. 24, 2008

(54) POSITION-MEASURING DEVICE AND METHOD FOR OPERATING A POSITION-MEASURING DEVICE

(75) Inventors: Markus Meissner, Pittenhart (DE); Joerg Drescher, Riedering (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 51 days.

(21) Appl. No.: 11/591,221

(22) Filed: Oct. 31, 2006

(65) Prior Publication Data

US 2007/0107247 A1 May 17, 2007

Related U.S. Application Data

(60) Provisional application No. 60/842,187, filed on Sep. 1, 2006, provisional application No. 60/735,515, filed on Nov. 10, 2005.

(30) Foreign Application Priority Data

| Nov. 9, 2005 | (DE) | ........................ 10 2005 053 789 |
| Sep. 1, 2006 | (DE) | ........................ 10 2006 041 357 |

(51) Int. Cl.
*G01D 5/38* (2006.01)
*G01D 5/347* (2006.01)

(52) U.S. Cl. ......................... 33/707; 356/616

(58) Field of Classification Search .................. 33/706, 33/707; 356/482, 485, 486, 614, 616, 617, 356/619, 496, 498
See application file for complete search history.

(56) References Cited

U.S. PATENT DOCUMENTS

| 6,494,616 | B1 | 12/2002 | Tokhtuev et al. |
| 6,771,377 | B2 * | 8/2004 | Jones et al. .................. 356/616 |
| 6,828,783 | B2 | 12/2004 | Schroter et al. |
| 6,879,405 | B2 * | 4/2005 | Tamiya et al. ................ 356/616 |
| 6,977,368 | B2 | 12/2005 | Drescher et al. |
| 2005/0168752 | A1 * | 8/2005 | Bell et al. .................... 356/482 |
| 2006/0092428 | A1 * | 5/2006 | Holzapfel et al. ........... 356/499 |
| 2007/0058173 | A1 | 3/2007 | Holzapfel .................... 356/499 |

FOREIGN PATENT DOCUMENTS

| DE | 101 58 223 | 6/2003 |
| DE | 10 2005 043 569 | 3/2007 |
| EP | 1 019 669 | 7/2000 |
| EP | 1 334 332 | 8/2003 |
| JP | 2007132932 A * | 5/2007 |
| WO | WO 02/33358 | 4/2002 |
| WO | WO 2005/088261 | 9/2005 |

OTHER PUBLICATIONS

International Search Report, PCT International Application No. PCT/EP2006/010525, dated Mar. 14, 2007.

* cited by examiner

*Primary Examiner*—R. A. Smith
(74) *Attorney, Agent, or Firm*—Kenyon & Kenyon LLP

(57) ABSTRACT

A position-measuring device is for determining the position of two objects which are arranged displaceably with respect to each other in at least one measuring direction, and a method is for the operation of such a position-measuring device. The position-measuring device includes a measuring graduation as well as a scanning device having a light source and one or a plurality of optical and/or optoelectronic components for generating displacement-dependent position signals. A semiconductor laser having great coherence length is provided as the light source, which is operated pulsed in a single-mode operational-mode.

18 Claims, 4 Drawing Sheets

POSITION-MEASURING DEVICE AND METHOD FOR OPERATING A POSITION-MEASURING DEVICE

CROSS-REFERENCE TO RELATED APPLICATIONS

The present application claims priority to Application No. 10 2005 053 789.8, filed in the Federal Republic of Germany on Nov. 9, 2005, claims priority to Application No. 10 2006 041 357.1, filed in the Federal Republic of Germany on Sep. 1, 2006, claims the benefit of U.S. Provisional Application No. 60/735,515, filed on Nov. 10, 2005, and claims the benefit of U.S. Provisional Application No. 60/842,187, filed on Sep. 1, 2006, each of which is expressly incorporated herein in its entirety by reference thereto.

FIELD OF THE INVENTION

The present invention relates to a position-measuring device and a method for operating a position-measuring device.

BACKGROUND INFORMATION

In systems for manufacturing semiconductor components, the spatial position of certain components that are displaceable relative to one another are determined with precision with the aid of suitable position-measuring devices. Using the determined positional data, a computer-controlled sequencing control can then be implemented in these systems. Conventionally, the requisite position measuring is predominantly performed via a plurality of laser interferometers. In the future, it is assumed that the accuracy requirements for the position measurement will continue to increase with simultaneously increasing positioning speeds of the various parts. Given the high accuracy requirements that will then result, laser interferometers may no longer be able to be used as position-measuring devices. Even with optimal air conditioning, the refractive index fluctuations in the surrounding air may lead to unacceptable measuring value fluctuations in the position determination, which are on the order of magnitude of a few nanometers (nm).

For this reason, alternative position-measuring devices have already been proposed for such systems. European Published Patent Application No. 1 019 669, for example, describes the use of optical position-measuring devices having so-called cross gratings as a two-dimensional measuring graduation. In the following text, such position-measuring devices will also be referred to as grating-based position-measuring devices. These systems are hardly affected by possible refractive index fluctuations of the air and therefore allow position measurements that are well reproducible.

Optical position-measuring devices having gratings as measuring graduations, which provide the necessary resolutions in the nanometer range, are usually based on interferential scanning principles. In this instance, in general, a light beam from a suitable light source is split up into a least two coherent partial beams of rays, which subsequently impinge upon a plurality of gratings in the scanning beam path before they are reunited and brought to interference. The position information that is ultimately of interest is provided by the (displacement-dependent) phase position of the two interfering partial beams of rays. The resulting path length difference is usually approaching zero for the two partial beams of rays between splitting up and reuniting in symmetrical scanning beam path variants of such systems. Therefore, a short coherence length of the light used is sufficient to provide the desired interference from the detection side.

German Published Patent Application No. 10 2005 043 569 describes an additional interferential position-measuring device, which has asymmetric scanning beam paths for the two partial beams of rays. This means that, based on this asymmetry, path length differences result for the partial beams of rays coming to interference, on the order of magnitude up to a few millimeters (mm). With regard to the required coherence length of the light used, this means that the coherence length has to be in the range of a few millimeters (mm) all the way up to a few centimeters (cm), otherwise no interference of the partial beams of rays that come to superposition is possible.

SUMMARY

Example embodiments of the present invention may provide a position-measuring device having a suitable light source for highly precise position measurements, as well as a method for its operation.

The position-measuring device for determining the position of two objects, which are arranged displaceably with respect to each other in at least one measuring direction, may include a measuring graduation as well as scanning device having a light source and one or a plurality of optical and/or optoelectronic components for generating displacement-dependent position signals. The light source is arranged as a semiconductor laser having great coherence length, which operates in a pulsed manner in a single-mode operational-mode.

The use of such a light source offers additional advantages, e.g., with regard to using the position-measuring device in high precision applications. Thus, based on the pulsed operation of the light source, measuring inaccuracies may be avoided which, for example, are able to be produced by a so-called memory jitter. By this, one understands inaccuracies which result based on the time between the measurement and the output of the actual position-measuring value. In this connection, references is made to European Published Patent Application No. 1 334 332, which is expressly incorporated herein in its entirety by reference thereto.

The semiconductor laser may have a coherence length greater than 200 μm.

The semiconductor laser may supply light pulses having pulse durations in the range of, e.g., 5 ns to 50 ns.

The light source may be arranged as a DFB semiconductor laser, as a DBR semiconductor laser or even as a mode-coupled semiconductor laser or mode-coupled solid-state laser, etc.

Asymmetrical partial scanning beam paths, having different optical path lengths, may be provided via the positioning of the scanning device, which are traversed by partial beams of rays before the partial beams of rays come superposed to interference.

The scanning device is arranged in a scanning unit that is displaceable relative to the measuring graduation, and the light source is arranged at a distance from the scanning unit, the light source being connected to the scanning unit with the aid of an optical fiber.

A device for determining the wavelength of the radiation used for the optical position determination may be assigned to the position-measuring device.

The device for determining the wavelength may be provided as a wavelength measuring unit, whose measured values are supplied to an evaluation unit which, in connection with a metrology model of the position-measuring device, undertakes a correction of the wavelength-dependent position errors.

Moreover, the device for determining the wavelength may be provided as an additional position-measuring device, which includes a scanning unit as well as a measuring graduation in a fixed spatial assignment, and whose measured values are supplied to an evaluation unit, which undertakes a correction of the wavelength-dependent position errors based on this.

The device for determining the wavelength may include a device for recording temperature, via which a determination of the temperature of the light source is made, and the recorded temperature is supplied to an evaluation unit, which undertakes a correction of the wavelength-dependent position errors based on this, using the known function of the wavelength of the temperature.

In a method for the operation of a position-measuring device for determining the position of two objects, which are arranged displaceably with respect to each other in at least one measuring direction, the position-measuring device includes a measuring graduation as well as scanning device having a light source and one or a plurality of optical and/or optoelectronic components for generating displacement-dependent position signals. The light source is arranged as a semiconductor laser having great coherence length, which operates in a pulsed manner in a single-mode operational-mode.

The semiconductor laser may be pulsed such that it delivers light pulses having pulse durations in the range of, e.g., 5 ns to 50 ns.

The wavelength of the radiation used for the optical position determination may also be determined.

For determining the wavelength, for example, a wavelength measuring unit may be used, whose measured values are supplied to an evaluation unit, using which a correction of the wavelength-dependent position errors is undertaken in connection with a metrology model of the position-measuring device.

Alternatively, an additional position-measuring device may be used for determining the wavelength, which includes a scanning unit as well as a measuring graduation in a fixed spatial association, and whose measured values are supplied to an evaluation unit, with the aid of which a correction is undertaken of the wavelength-dependent position errors.

Moreover, for determining the wavelength, a device for recording temperature may be used, via which a determination of the temperature of the light source is made, and the recorded temperature is supplied to an evaluation unit, which undertakes a correction of the wavelength-dependent position errors, using the known function that the wavelength is of the temperature.

According to an example embodiment of the present invention, a position-measuring device for determining a position of two objects movable with respect to each other in at least one measuring direction includes: a measuring graduation; and a scanning device including a light source and at least one component adapted to generate displacement-dependent position signals, the component at least one of (a) optical and (b) optoelectronic. The light source includes a semiconductor laser having great coherence length that operates in a pulsed manner in a single-mode operational-mode.

The semiconductor laser may have a coherence length greater than 200 μm.

The semiconductor laser may be adapted to supply light pulses having pulse durations in the range of 5 ns to 50 ns.

The light source may include a DFB semiconductor laser.

The light source may include a DFB semiconductor laser.

The light source may include at least one of (a) a mode-coupled semiconductor laser and (b) a mode-coupled solid-state laser.

A position of the scanning device may provide asymmetrical partial scanning beam paths having different optical path lengths traversed by partial beams of rays before the partial beams of rays come superposed to interference.

The scanning device may be arranged in a scanning unit that is movable relative to the measuring graduation, and the light source may be arranged at a distance from the scanning unit, the light source being connected to the scanning unit by an optical fiber.

The position-measuring device may include a determination device adapted to determine a wavelength of radiation used for optical position determination.

The determination device may include a wavelength measurement unit, and measured values of the wavelength measurement unit may be supplied to an evaluation unit, which may be adapted to perform a correction of wavelength-dependent position error in accordance with a metrology model of the position-measuring device.

The determination device may includes an additional position-measuring device, which may include a scanning unit and a measuring graduation in a fixed spatial assignment, and measured values of the additional position-measuring device may be supplied to an evaluation unit adapted to perform a correction of wavelength-dependent position errors.

The determination device may include a temperature recordal device adapted to determine a temperature of the light source, and the determined temperature may be supplied to an evaluation unit adapted to perform a correction of wavelength-dependent position errors in accordance with a known function of the wavelength of the temperature.

According to an example embodiment of the present invention, a method for operating a position-measuring device for determining a position of two objects movable with respect to each other in at least one measuring direction, the position-measuring device including a measuring graduation and a scanning device including having a light source and at least one component adapted to generate displacement-dependent position signals, the component at least one of (a) optical and (b) optoelectronic, includes: operating the light source, arranged as a semiconductor laser having great coherence length, in a pulsed manner in a single-mode operational-mode.

The semiconductor laser may be operated pulsed in the operating step to deliver light pulses having pulse durations in the range of 5 ns to 50 ns.

The method may include determining a wavelength of radiation used for optical position determination.

The wavelength determination may include: supplying measured values from a wavelength measurement unit to an evaluation unit; and performing a correction of wavelength-dependent position errors in accordance with a metrology model of the position-measuring device.

The wavelength determination may include: supplying measured values of an additional position-measuring device to an evaluation unit, the additional position-measuring device including a scanning unit and a measuring graduation in a fixed spatial assignment; and performing a correction of wavelength-dependent position errors.

The wavelength determination may include: determining a temperature of the light source by a temperature recordal device; supplying the determined temperature to an evaluation unit; and performing a correction of wavelength-dependent position errors in accordance with a known function of the wavelength of the temperature.

Other features and aspects of example embodiments of the present invention are described in more detail below with reference to the appended Figures.

DETAILED DESCRIPTION

Figure 1:
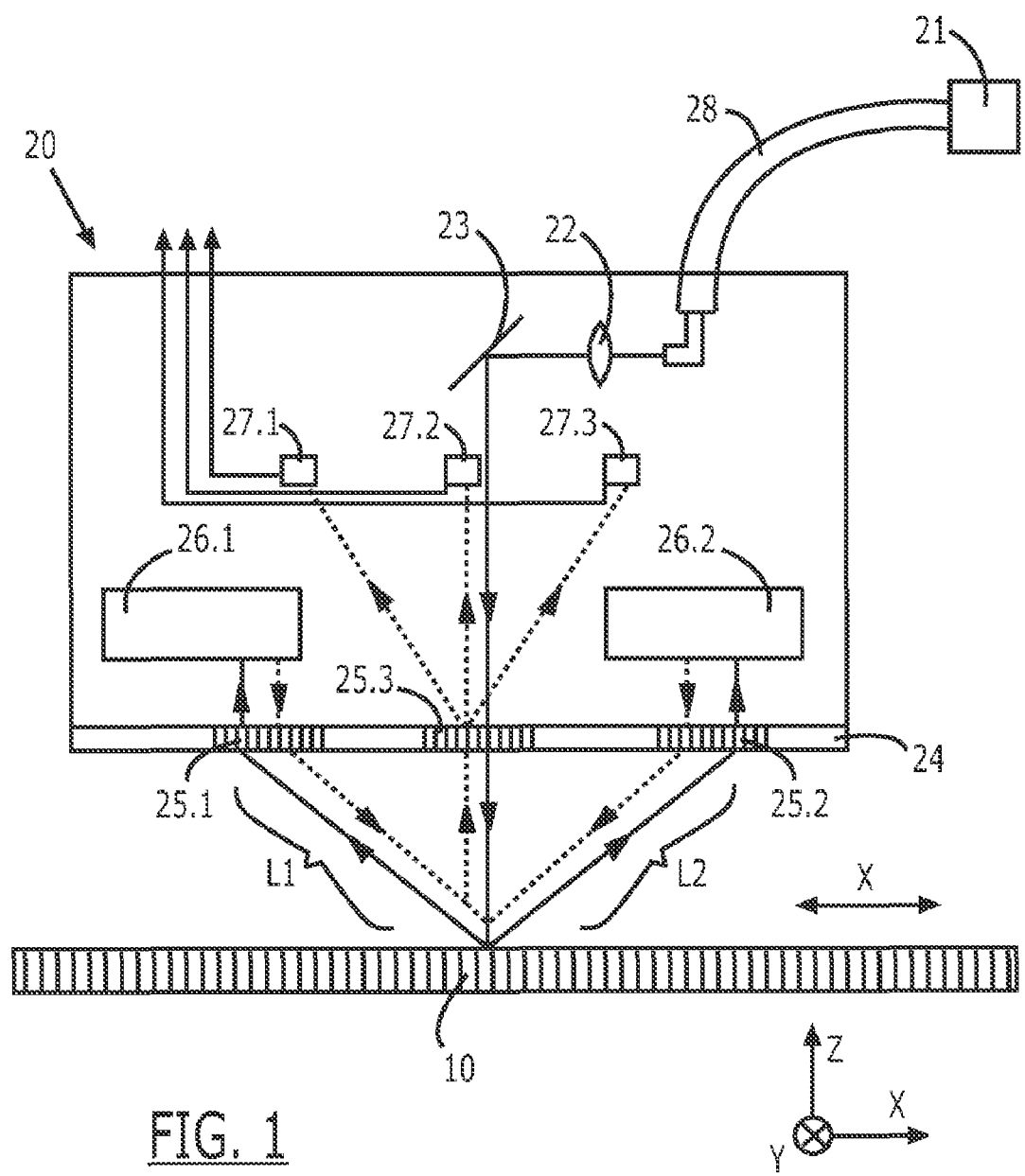
FIG. 1 is a schematic view of a position-measuring device according to an example embodiment of the present invention.

A schematic view of a grating-based position-measuring device (encoder) according to an example embodiment of the present invention is provided in FIG. 1.

The position-measuring device includes a measuring graduation 10, a scanning unit 20 that is displaceable at least relatively in the measuring direction x, and a light source 21 arranged at a distance from scanning unit 20.

Measuring graduation 10 and scanning unit 20 are connected to two objects whose position with respect to each other is to be determined. For example, as explained above, the objects or components that are movable with respect to each other may be components of a device for producing semiconductor component elements.

Measuring graduation 10 is arranged as a linear reflection measuring graduation, and includes areas of different reflectivities that alternate in the measuring direction x.

The elements on the scanning side for generating displacement-dependent position signals will also be referred to as scanning devices, in the following. Besides light source 21, they also include various additional optical and/or optoelectronic components. These component elements may be arranged, for example, in scanning unit 20 and/or in a suitable operating connection with same, e.g., via suitable optical fibers, etc. In the following, the scanning beam path of the exemplary embodiment illustrated in FIG. 1 should be understood as the explanation of the functioning of the scanning devices. Alternative scanning beam paths may also be provided within the present context.

In the example illustrated in FIG. 1, the beams of rays emitted in the form of light pulses by light source 21 are supplied to scanning unit 20 via an optical fiber 28. The following provides a description of particularly suitable light sources. The light pulses, or rather beams of rays, reach a path-folding mirror 23, via a coupling out lens 22, and the former deflects them in the direction of measuring graduation 10. The beams of rays then propagate in the direction of measuring graduation 10 through a transparent area of a scanning plate 24 on the lower side of scanning unit 20. There they are diffracted or split up, upon their first incidence, into two partial beams of rays of $+1^{st}$ and $-1^{st}$ order, and are reflected back in the direction of scanning unit 20. The split-up partial beams of rays then pass-through respectively first scanning gratings 25.1, 25.2 in scanning plate 24, and are diffracted again via downstream retroreflection elements 26.1, 26.2 in the direction of measuring graduation 10. The diffracted partial beams of rays are illustrated in FIG. 1 as dashed lines. Suitable prisms, path-folding mirror combinations, etc., for example, function as retroreflection elements 26.1, 26.2. After again passing through second scanning gratings in scanning plate 24, and the deflection of direction resulting in the process, the partial beams of rays impinge for a second time upon measuring graduation 10. The illustration of the folded back partial beams of rays is indicated in FIG. 1 only schematically. The partial beams of rays are once again diffracted on measuring graduation 10 such that a pair of parallel partial beams of rays propagates in the direction of scanning unit 20. In scanning unit 20, the partial beams of rays impinge on a further scanning grating 25.3 on scanning plate 24, where there takes place a splitting up into three pairs of interfering partial beams of rays into three spatial directions. In the respective spatial directions three detector elements 27.1, 27.2, 27.3 are arranged in scanning unit 20, via which the phase-shifted position signals are able to be recorded.

Alternatively to the illustrated positioning of detector elements 27.1 to 27.3 in scanning unit 20, it is possible to position these, similar to light source 21, in a manner that is spatially separated from same, and to supply the partial beams of rays that are to be detected to the detector elements via optical fibers.

The partial beams of rays travel through clearly different optical path lengths L1 and L2 between the first and second reflection on measuring graduation 10, e.g., L1≈L2. This is indicated schematically in FIG. 1. Consequently, asymmetrical partial scanning beam paths are present, having clearly different optical path lengths for the partial beams of rays, which then come to interference. Based on this asymmetry, the above-discussed requirements result with respect to a great coherence length of the light source used, if an interference signal is to be evaluated for a position determination on the detection side.

Figure 2:
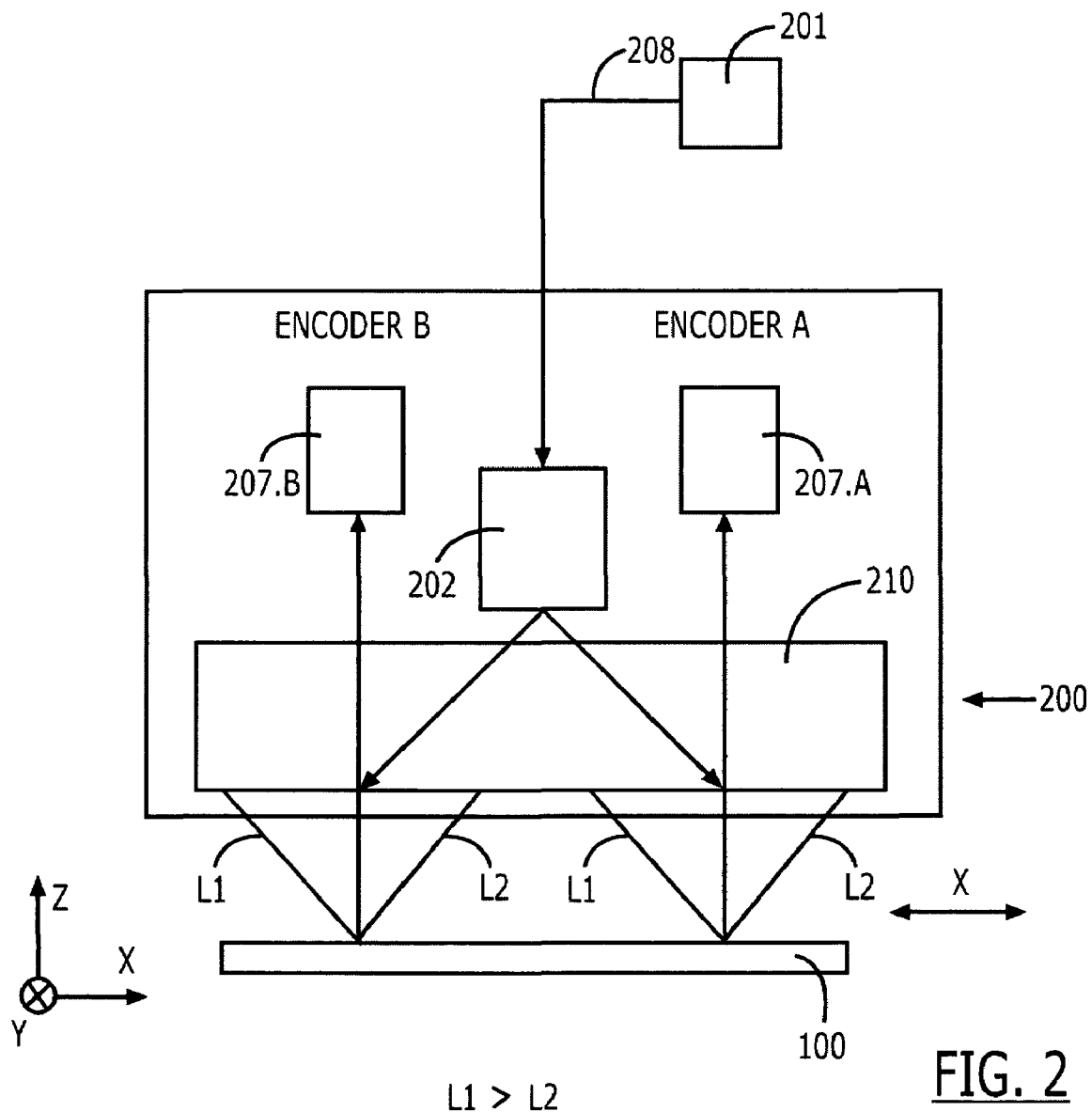
FIG. 2 is a schematic view of a position-measuring device according to an example embodiment of the present invention.

Before going into detail on the suitable light source, with reference to FIGS. 3a to 3c, an exemplary embodiment of a position-measuring device is explained with reference to FIG. 2. FIG. 2 represents only a greatly schematic illustration of the corresponding position-measuring device.

FIG. 2 illustrates a scanning unit 200 which is arranged opposite a measuring graduation 100, displaceable in at least one measuring direction x. The light pulses emitted by a light source 201 are supplied to scanning unit 200, via an optical fiber 208.

The position-measuring device illustrated in FIG. 1, by contrast to that illustrated in FIG. 1, not only permits determining the relative movement in the given measuring direction x, but additionally also a simultaneous position determination in the perpendicular direction z. Accordingly, one is able to determine, in addition, the distance between measuring graduation 100 and scanning unit 200.

For this purpose, as is illustrated schematically in FIG. 2, scanning unit 200 includes two such scanning beam paths as explained with reference to FIG. 1. In FIG. 2, the two scanning beam paths are indicated by ENCODER A and ENCODER B. Each of the two scanning beam paths is accordingly provided in principle like the scanning beam path in the example illustrated in FIG. 1. For example, with regard to optical path lengths L1, L2 traveled in the split-up partial beams of rays, the latter are clearly different, that is, L1<L2 applies.

The light pulse, supplied on the input side of a light source 201, that is arranged separately from scanning unit 200, is supplied to scanning unit 200 via optical fiber 208, and is split up via a splitting optical system 202 to the two scanning beam paths. The optical components counted among the scanning devices are indicated in FIG. 2 in scanning unit 200, e.g., in schematic form as block 210. Also indicated only as schematic blocks are optoelectronic detector elements 207.A, 207.B, that are also counted among the scanning devices. The signals recorded via these detector elements 207.A, 207.B are supplied to an evaluation unit for further processing.

With respect to details of the scanning beam paths, reference is made to German Patent Application No. 10 2005 043 569.6, which is expressly incorporated herein in its entirety by reference thereto.

In the position-measuring device illustrated in FIG. 2, a particularly selected light source is used, which may provide special advantages for high-precision measurements.

The light source is arranged as a semiconductor laser having great coherence length, which works or is operated in a pulsed manner in a single-mode operational-mode. For example, the coherence length may be a range between, e.g., 1 mm and 1 cm. Even in the case of greatly asymmetrical partial scanning beam paths, as in the two scanning variants explained above, interference of the two partial beams of rays may thereby be ensured which, after the second diffraction and unification at the measuring graduation, propagate in parallel in the direction of the detector elements.

Furthermore, the respective measuring task may require using a pulsed scanning method, as is described, for example, in European Published Patent Application No. 1 334 332. In this manner, the scanning time is determined solely by the light pulse, that is, the memory jitter mentioned above and the measuring inaccuracies resulting from it in the position determination may be avoided or at least minimized in the pulsed scanning method.

The semiconductor laser provided as light source also has to be operable for this purpose in a pulsed manner, pulse durations in the range of between, e.g., 5 ns and 50 ns having to be possible. In the case of the use of conventional, pulsedly operable semiconductor lasers or laser diodes (such as Fabry-Perot laser diodes), as described, for example, in European Published Patent Application No. 1 334 332, only a multi-mode operation of the same is able to be implemented. However, in multi-mode operation only short coherence lengths are able to be reached, which contradicts the requirement for coherence lengths that are as great as possible, based on asymmetrical partial scanning beam paths.

The light sources selected in the form of the semiconductor lasers, having sufficiently great coherence length, which, in addition, work in a pulsed manner in single-mode operational-mode, avoid these problems. Typical semiconductor lasers that satisfy these requirements are, for example, so-called DFB (distributed feedback) semiconductor lasers, DBR (distributed Bragg reflector) semiconductor lasers or mode-coupled semiconductor lasers or solid-state lasers, etc.

The DFB and the DBR semiconductor lasers differ, in this regard, by an additional filter structure within the laser of conventional Fabry-Perot semiconductor lasers. In dynamic operation, this filter structure leads to a single laser mode being formed already after a very short time (e.g., ca. 14 ps in the case of DFB semiconductor lasers). Based on this very quick transient process, such a semiconductor laser, in the case of pulses in the ns range, emits almost exclusively in one mode, which has a very narrow bandwidth, and consequently, also a sufficiently great coherence length for the present application.

Figure 3A:
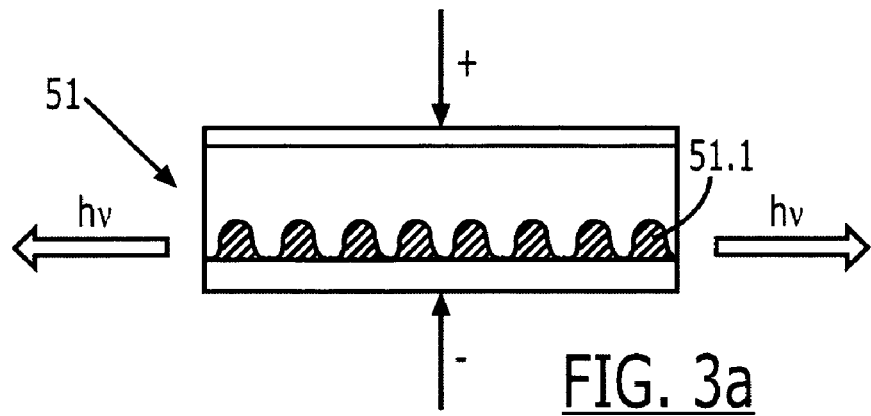
FIGS. 3a to 3c are schematic views of suitable light sources for the position-measuring device.

FIG. 3a illustrates a DFB semiconductor laser 51 in greatly schematic form. In these semiconductor lasers, the filter structure is provided as a refractive index grating 51.1 within the laser resonator. This results in the still possible development of two modes, but by technical measures with respect to the system symmetries, in the last analysis one is able to select one mode in a targeted manner.

Figure 3B:
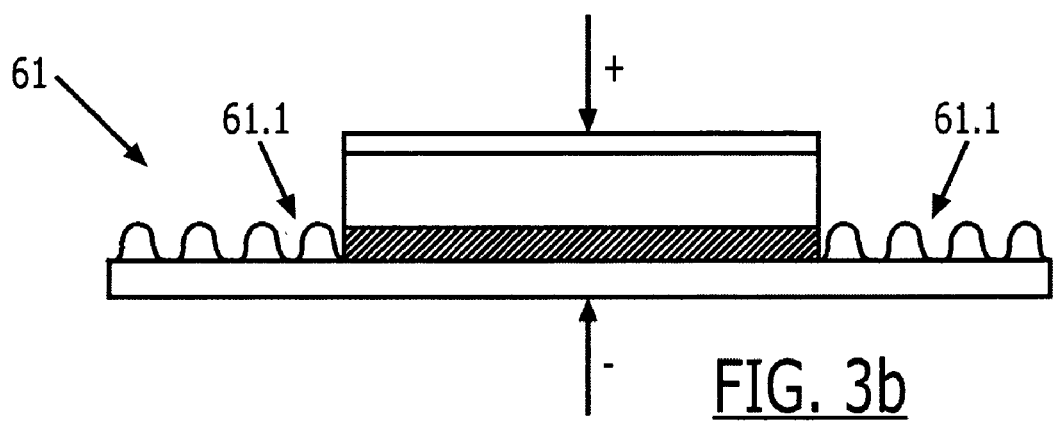

A DBR semiconductor laser 61 is illustrated in FIG. 3b, also in a greatly schematic manner. DBR semiconductor lasers utilize a similar principle as the DFB semiconductor lasers mentioned. The laser-active semiconductor layer has a Bragg grating 61.1 preconnected or postconnected as reflector, which also has a filtering effect.

The two semiconductor laser variants mentioned may be operated dynamically in single mode, and give coherence lengths of several centimeters (e.g., DFB semiconductor laser: >6 cm), which makes them suitable as light sources for the position-measuring device described herein.

By contrast to these semiconductor laser types, in the case of the Fabry-Perot semiconductor laser, when the current is switched on, many laser modes begin to oscillate, from which there then forms a single mode based on amplification differences. For example, the time constant may be 10 ns to 15 ns.

Figure 3C:
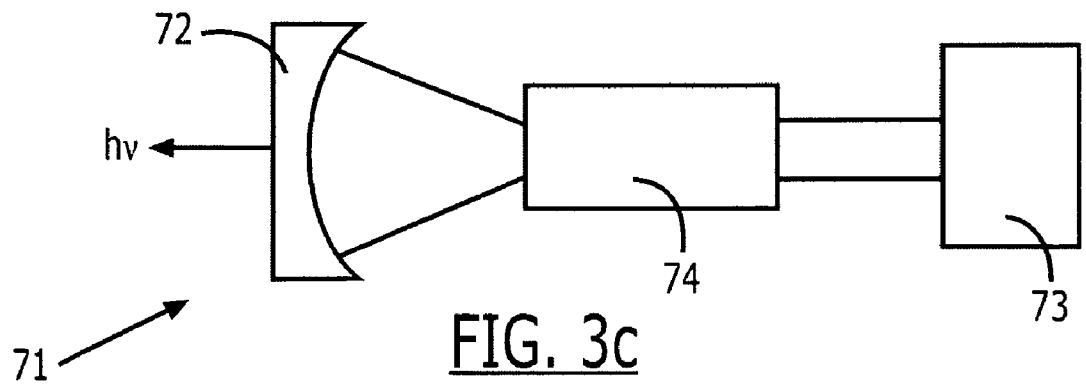

In a further schematic illustration, FIG. 3c illustrates a conventional mode-coupled semiconductor laser which is also suitable as light source 71. Adjacent to laser medium 74, a mirror 72 is arranged on the light exit side, having a reflectivity of about 98%, and on the opposite resonator side there is a saturable absorption element 73, which has a reflectivity of 0% or 100%, depending on the switching state.

As the advantage already discussed above, of the relatively long coherence lengths of the light sources selected, it is again mentioned that, by contrast to Fabry-Perot semiconductor lasers having a restriction of the path difference between the two interfering partial beams to less than 200 µm, scanning principles are able to be implemented in response to which partial scanning beam paths are possible that have path differences of up to a plurality of centimeters.

That is why, in providing position-measuring devices that are operated in a pulsed manner, one is no longer limited to greatly symmetrical scanning beam paths, but rather asymmetrical scanning beam paths are also possible.

In addition, the greater admissible path length difference for the interfering partial beams of rays may be used for a broadened tolerance range, since, because of a possible tilting of the measuring graduation and the scanning unit of the position-measuring device, the two interfering partial beams of rays also pass through different optical path lengths. When the light sources mentioned above are used, this offers the opportunity of allowing greater tilting tolerances than were conventional, when using interferential position-measuring devices.

An additional advantage of such light sources is that they have only a low chirp, that is, a low frequency response characteristic over the pulse curve over time. In conventional directly modulated semiconductor lasers, there is usually a frequency variation as a function of time during the pulse. This so-called chirp has an influence on the coherence length discussed above. For example, the coherence length decreases with increasing chirp.

Furthermore, such a frequency variation influences the degree of modulation of the resulting position signal. Basically, the degree of modulation of the position signal decreases with growing chirp. Thus, using a DFB semiconductor laser or a DBR semiconductor laser or a mode-coupled laser, that are operated in a pulsed manner, also improves the position signal in comparison with the use of Fabry-Perot semiconductor lasers as light sources.

In connection with the light sources discussed, it should also be mentioned that they may also be used in other applications or other position-measuring devices.

For example, in the case of position-measuring devices having asymmetrical partial scanning beam paths, a further problem arises with regard to the light source used or rather the radiation supplied by it. Thus, the position signal generated is also a function of the wavelength of the radiation used. So long as possible wavelength fluctuations are not too large within a specified time interval, no errors result in the position determination. But in the case of fluctuations of the respective wavelength that are too great, and the faulty measurement that may thereby threaten, a correction of this influence may become necessary. To do this, in the simplest case, the current wavelength at the time of measurement, or a position depending on this in a conventional manner, or other measuring variables may be used for purposes of correction. Using the known function of the measured position of the measured wavelength, this position may also be corrected in a simple manner in the case of a wavelength variation.

Figure 4A:
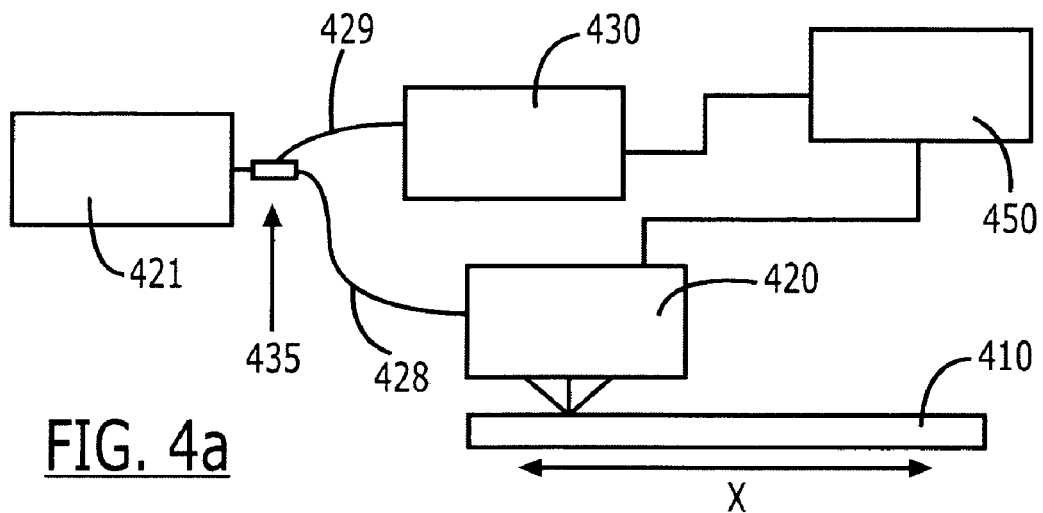
FIGS. 4a to 4c are schematic views of an arrangement for recording the wavelength in connection with the position-measuring device.
Figure 4B:
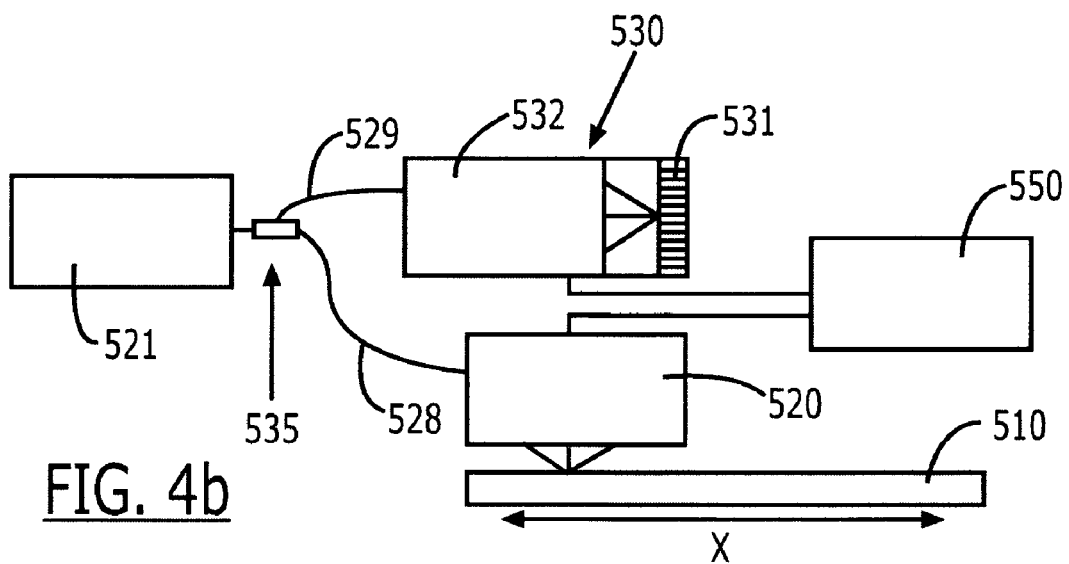

Accordingly, in order to take into consideration wavelength-dependent effects, it may be provided basically to record wavelengths using suitable devices, on the part of the position-measuring device used, in order to further use the data resulting therefrom for correction purposes. Suitable possibilities for the compensation of wavelength-dependent errors in the position measuring are explained below, with reference to FIGS. 4a to 4c.

In a first variant, the control or recording of the wavelength may, for example, be performed via a wavelength measurement device in the form of a so-called wavemeter or etalons of high resolution. For this, reference is made to FIG. 4a, which illustrates, in a greatly schematic form, a position-measuring device having a measuring graduation 410, a scanning unit 420, a light source 421 that is in operative connection with the scanning unit via an optical fiber 428, and a wavelength measuring unit 430, whose measured values are supplied to an evaluation unit 450. The radiation emitted by the light source is also supplied to wavelength measuring unit 430 via an optical fiber coupler 435 and an additional optical fiber 429, for the determination of the wavelength.

Using an appropriate metrology model of the position-measuring device, possible position deviations caused by wavelength variations may be corrected via subsequent position signal processing in evaluation unit 450. By metrology model of a position-measuring device one should understand basically a function, such as a polynomial, which describes the influence of motion tolerances (tiltings), manufacturing tolerances (gap angles, etc.) and wavelength on the position information generated.

An alternative, second variant for measuring the wavelength is the use of an additional position-measuring device, as is also used for the actual position determination. For this, reference is made to FIG. 4b. Additional position-measuring device 530 includes a scanning unit 532, which is fixedly connected to a measuring graduation 531. The radiation of light source 521 that is used in the actual position-measuring device is also supplied to additional position-measuring device 530 via an optical fiber coupler 535, and again it includes a scanning unit 520 and a measuring graduation 510 in a defined constant relative orientation to one another. If position variations appear in the additional position-measuring device, these are caused by wavelength fluctuations in the radiation emitted by light source 521. In this variant, these position variations are able to be converted into wavelength variations via evaluation unit 550, or the position variations may be used directly for the correction of the measured object position. If the position-measuring device used for the wavelength measurement is exposed to the same thermal surroundings as the position-measuring device used for the actual position determination, thermal drifts may also be compensated for at the same time.

Figure 4C:
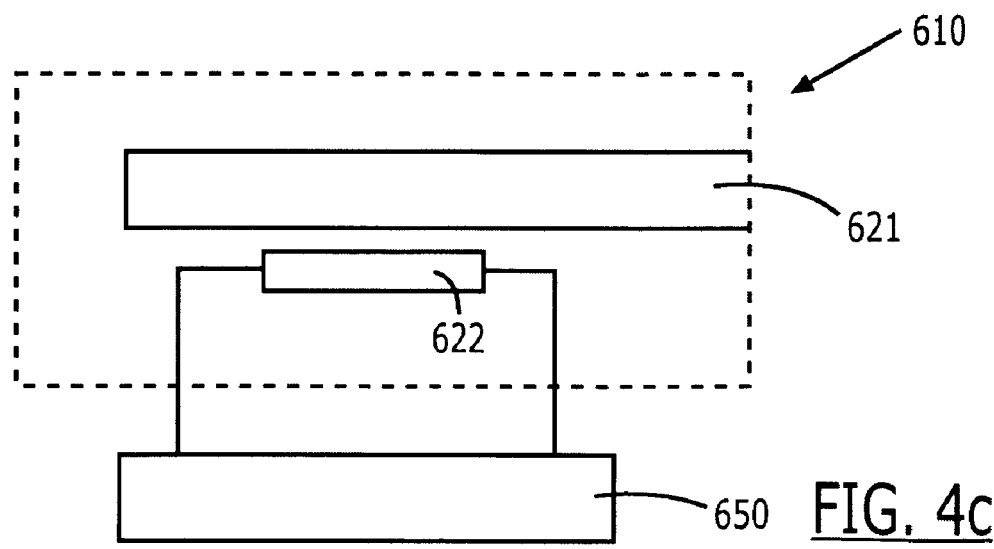

In a third variant, of which FIG. 4c schematically illustrates, the wavelength-dependent correction may be made by measurement of the temperature of light source 621 that is used. This is offset using the known wavelength dependence of light source 621, which, if necessary, still has to be determined in a separate measuring step. To do this, one may, for example, position conventional temperature sensors 622 at the semiconductor laser that is being used, and supply their measured values to a suitable evaluation unit 650.

What is claimed is:

1. A position-measuring device for determining a position of two objects movable with respect to each other in at least one measuring direction, comprising:
   a measuring graduation; and
   a scanning device including a light source and at least one component adapted to generate displacement-dependent position signals, the component at least one of (a) optical and (b) optoelectronic;
   wherein the light source includes a semiconductor laser having great coherence length that operates in a pulsed manner in a single-mode operational-mode.

2. The position-measuring device according to claim 1, wherein the semiconductor laser has a coherence length greater than 200 μm.

3. The position-measuring device according to claim 1, wherein the semiconductor laser is adapted to supply light pulses having pulse durations in the range of 5 ns to 50 ns.

4. The position-measuring device according to claim 1, wherein the light source includes a DFB semiconductor laser.

5. The position-measuring device according to claim 1, wherein the light source includes a DFB semiconductor laser.

6. The position-measuring device according to claim 1, wherein the light source includes at least one of (a) a mode-coupled semiconductor laser and (b) a mode-coupled solid-state laser.

7. The position-measuring device according to claim 1, wherein a position of the scanning device provides asymmetrical partial scanning beam paths having different optical path lengths traversed by partial beams of rays before the partial beams of rays come superposed to interference.

8. The position-measuring device according to claim 1, wherein the scanning device is arranged in a scanning unit that is movable relative to the measuring graduation, and the light source is arranged at a distance from the scanning unit, the light source being connected to the scanning unit by an optical fiber.

9. The position-measuring device according to claim 1, further comprising a determination device adapted to determine a wavelength of radiation used for optical position determination.

10. The position-measuring device according to claim 9, wherein the determination device includes a wavelength measurement unit, measured values of the wavelength measurement unit supplied to an evaluation unit, which is adapted to perform a correction of wavelength-dependent position error in accordance with a metrology model of the position-measuring device.

11. The position-measuring device according to claim 9, wherein the determination device includes an additional position-measuring device, which includes a scanning unit and a measuring graduation in a fixed spatial assignment, measured values of the additional position-measuring device supplied to an evaluation unit adapted to perform a correction of wavelength-dependent position errors.

12. The position-measuring device according to claim 9, wherein the determination device includes a temperature recordal device adapted to determine a temperature of the light source, the determined temperature supplied to an evaluation unit adapted to perform a correction of wavelength-dependent position errors in accordance with a known function of the wavelength of the temperature.

13. A method for operating a position-measuring device for determining a position of two objects movable with respect to each other in at least one measuring direction, the position-measuring device including a measuring graduation and a scanning device including having a light source and at least one component adapted to generate displacement-dependent position signals, the component at least one of (a) optical and (b) optoelectronic, comprising:

operating the light source, arranged as a semiconductor laser having great coherence length, in a pulsed manner in a single-mode operational-mode.

14. The method according to claim 13, wherein the semiconductor laser is operated pulsed in the operating step to deliver light pulses having pulse durations in the range of 5 ns to 50 ns.

15. The method according to claim 13, further comprising determining a wavelength of radiation used for optical position determination.

16. The method according to claim 15, wherein the wavelength determination includes:

supplying measured values from a wavelength measurement unit to an evaluation unit; and performing a correction of wavelength-dependent position errors in accordance with a metrology model of the position-measuring device.

17. The method according to claim 15, wherein the wavelength determination includes:

supplying measured values of an additional position-measuring device to an evaluation unit, the additional position-measuring device including a scanning unit and a measuring graduation in a fixed spatial assignment; and performing a correction of wavelength-dependent position errors.

18. The method according to claim 15, wherein the wavelength determination includes:

determining a temperature of the light source by a temperature recordal device;

supplying the determined temperature to an evaluation unit; and performing a correction of wavelength-dependent position errors in accordance with a known function of the wavelength of the temperature.

* * * * *